United States Patent Office 2,971,537
Patented Feb. 14, 1961

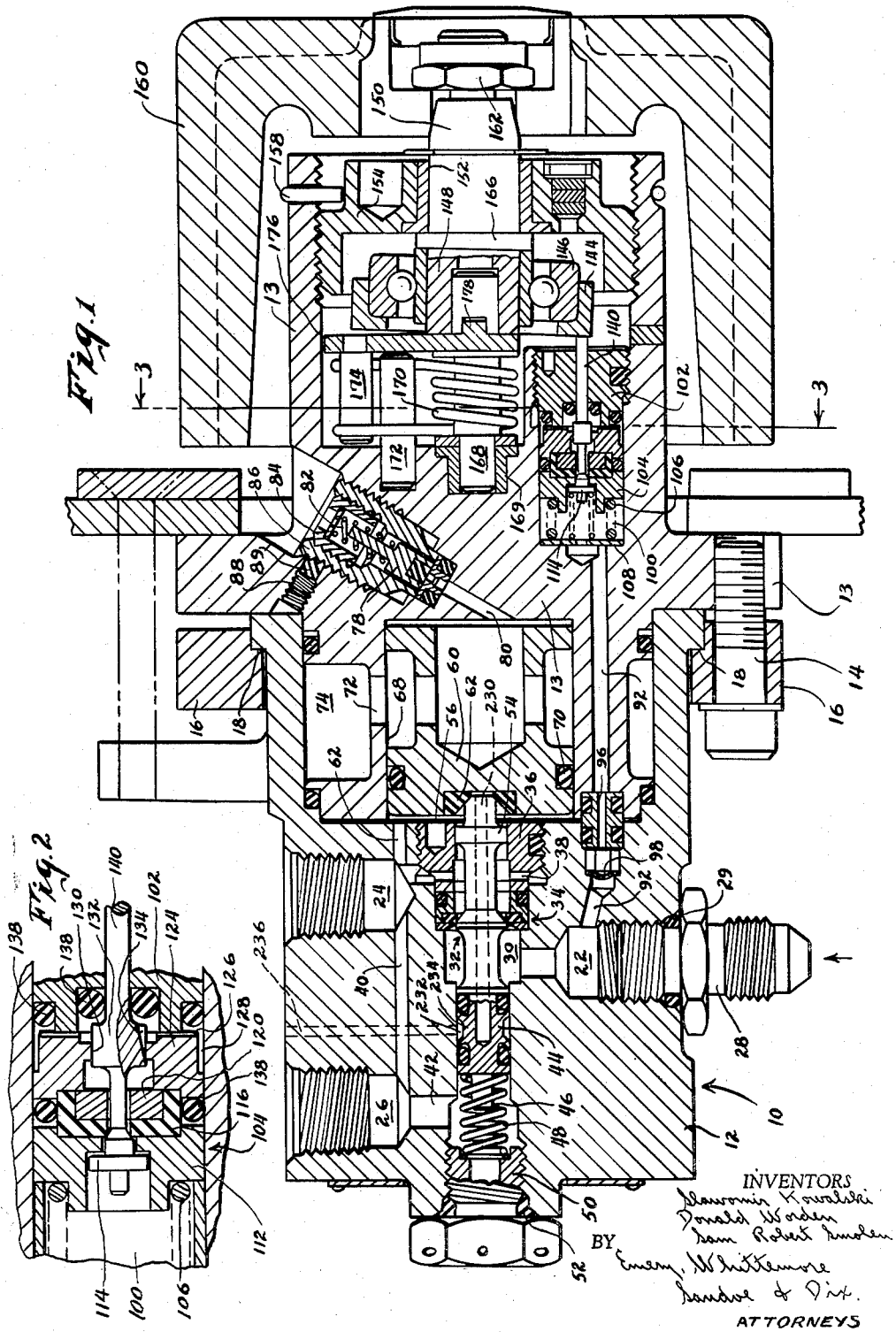

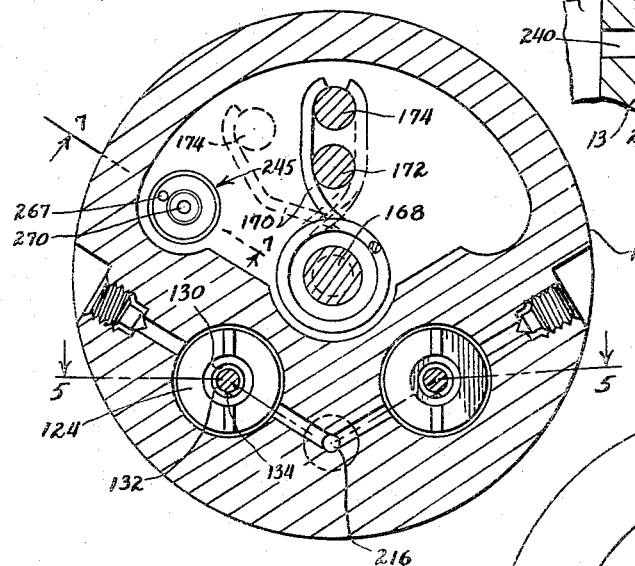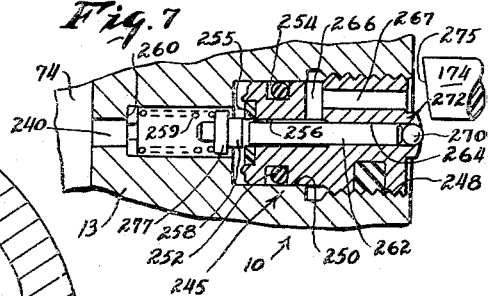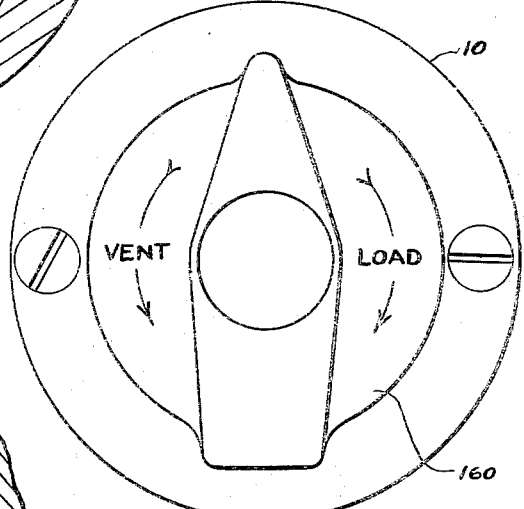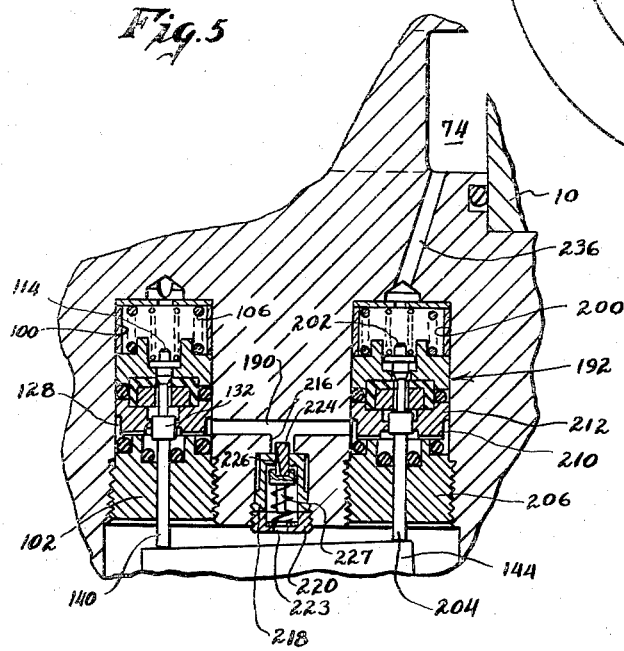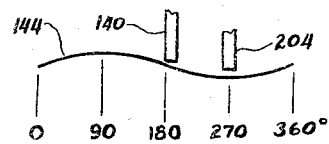

2,971,537

CONTROL VALVES FOR SENSING PRESSURE CHAMBER

Slawomir Kowalski, Rockaway, Donald A. Worden, Pompton Plains, and Sam Robert Smolen, Clifton, N.J., assignors to Marotta Valve Corporation, Boonton, N.J., a corporation of New Jersey Filed Nov. 27, 1957, Ser. No. 699,382

9 Claims. (Cl. 137—636.1)

This invention relates to pressure regulators.

It is an object of the invention to provide an improved pressure regulator of a construction that permits a wider operating range than has been available with pressure regulators of the prior art. The preferred embodiment of the invention operates with an inlet pressure range of between 100 and 6,000 pounds per square inch, and an outlet pressure range between 50 and 4,500 pounds per square inch. These figures are given merely by way of illustration.

The pressure regulator of this invention utilizes a gas pressure as the sensing pressure for determining when the valve needs to be opened to maintain the downstream pressure; and it is another object of the invention to provide improved controls for adjusting the regulator for different pressures, and by means of a common actuator for both raising and reducing the pressure adjustment.

Other objects, features and advantages of the invention will appear or be pointed out as the description proceeds.

In the drawing, forming a part hereof, in which like reference characters indicate corresponding parts in all the views;

Figure 1 is a sectional view through a pressure regulator made in accordance with this invention;

Figure 2 is an enlarged, fragmentary sectional view of a part of the apparatus shown in Figure 1;

Figure 3 is an enlarged, sectional view taken on the line 3—3 of Figure 1;

Figure 4 is an end view of the regulator shown in Figure 1;

Figure 5 is an enlarged, sectional view taken on the line 5—5 of Figure 3;

Figure 6 is a diagrammatic development showing the way in which the valves are operated by the wobble plate; and Figure 7 is a sectional view taken on the line 7—7 of Figure 3.

Figure 1 shows a pressure regulator having a housing 10 consisting of a left-hand section 12 and a right-hand section 13 connected together by screws 14 at angularly spaced locations around the housing. Only one of the screws 14 is shown in Figure 1 but the construction is well-known. The screws 14 extend through a clamping ring 16 and thread into a flange on the section 13 of the housing. The ring 16 engages behind a shoulder 18 to hold the section 12 clamped against the section 13 of the housing.

The pressure regulator has an inlet port 22, an outlet port 24 and a gage port 26. Each of these ports is threaded. A fitting 28 is shown screwed into the inlet port 22 with a packing ring 29 for preventing leakage of gas along the threads of the fitting.

Gas entering the housing 10 through the inlet port 22 flows into a valve chamber 30 in which there is a valve element 32. This valve element closes against a seat which is of composite construction but indicated generally by the reference character 34. Beyond the seat 34 there is a bushing 36 threaded into a counterbore and enclosing the portion of the valve chamber beyond the seat 34. There are radial ports 38 extending through the side of the bushing 36 and communicating, through a clearance in the counterbore, with the outlet port 24.

A connecting passage 40 leads from the outlet port 24 to the gage port 26 so as to maintain a pressure at the gage port which is always equal to that at the outlet port 24. The valve element 32 is counterbalanced. A passage 42 from the gage port 26 opens into a bore in which a cylindrical section 44 of the valve element slides. This cylindrical section 44 has packing rings and slides as a piston in a bore which extends to the right from the valve chamber 30.

This compression spring 48 is held between the cylindrical section 44 of the valve element and a plug 50 threaded into an end opening aligned with the valve element. There is a packing ring 52 between the head of the plug 50 and a flaring end wall of the opening into which the plug is threaded.

The seat 34 is the same diameter as the cylinder core to the left of chamber 30. The valving element 32 is thus balanced on the inlet pressure side. This means that inlet pressure exerts no force on the valving element and therefore fluctuations of the inlet pressure have no effect on the regulated pressure.

The valve element 32 has a bias toward closed position. This bias is produced by the pressure of the spring 48 which urges the valve element 32 into contact with the seat 34. The valve element 32 is moved in the other direction by the operating piston 60. This piston 60 is shown with a plastic insert 62 in actual contact with the end of the valve element 32; but the insert 62 is to be considered a part of the piston and movement of the piston 60 toward the left in Figure 1 moves the valve element 32 away from the seat 34, that is, into its open position.

The operating piston 60 slides in a cylinder 68 formed in one end of the housing section 13. The piston 60 has a packing ring 70; and the piston is moved, toward the left in Figure 1, by gas pressure which flows into the cylinder 68 through a plurality of angularly spaced ports 72 opening from the cylinder 68 into an expansion chamber 74.

The purpose of the expansion chamber 74 is to avoid shock loading of the piston 60. The ports through which gas is supplied to the chamber 74 are of comparatively small cross section compared to the volume of the chamber 74; and this limits the rate at which pressure builds up within the cylinder 68 and behind the operating piston 60.

The pressure in the chamber 74 and cylinder 68 is referred to herein as the "sensing pressure," and it is adjusted to change the downstream pressure which the regulator will maintain. The sensing pressure is, of course, substantially greater than the pressure of the biasing spring 48. In calibrating the invention, the downstream pressure which corresponds to any particular sensing pressure, must be determined with allowance for the pressure of the spring 48 against the operating piston 60.

The cylinder 68 is equipped with a safety valve 78 at the upper end of a passage 80. The safety valve 78 is loaded by a spring 82 compressed against the back of the safety valve by a bushing 84 which threads into a larger bushing 86 in which the safety valve 78 has sliding movement.

This larger bushing 86 threads into a counterbore in the housing at the upper end of the passage 80. The bushing 86 is locked in position by a set screw 88 compressing a plug 89 against the threads of the bushing 86.

The gas for the sensing pressure is obtained through a passage 92 communicating with the port 22 in the housing section 12 and leading through a connecting nipple 96 where the housing sections 12 and 13 confront one another. A screen 98 prevents the entrance of foreign matter into the passage 92 beyond the nipple 96.

The passage 92 leads to a valve chamber 100. The end of the valve chamber 100, opposite to the passage 92, is closed by a bushing 102 threaded into a counterbore at the end of the chamber 100. A valve seat 104 is pressed toward the right in Figure 1 by a spring 106. The other end of the spring 106 contacts with a washer 108 in the end of the valve chamber 100.

Figure 2 shows on a larger scale the structure associated with the valve chamber 100. The valve seat 104 includes a ring 112 with an opening therein for a valve element 114. The valve seat also includes a plastic insert 116 fitted into a recess on the downstream side of the ring 112; and this plastic insert 116 is reinforced with a metal disc 120.

There is a gas passage through the plastic insert 116 and the reinforcing ring 120; and this gas passage is of somewhat smaller diameter than the opening through the ring 112 so as to provide an annular area against which a tapered face of the valve element 114 contacts when the valve element is in its closed position.

Another ring 124 has a recessed face for receiving the downstream end of the plastic insert 116. This ring 124 contacts with the face of the bushing 102, but has radially extending ports 126 through which gas flows into a clearance 128 around the outside of a portion of the length of the ring 124.

There is an opening 130 in the ring 124 and this opening is filled by a collar 132, which is preferably of one-piece construction with the stem of the valve element 114. This collar 132 has no packing and fits within the opening 130 as a sliding fit. The clearance is so small as to block any flow of gas through the opening 130 except for incidental leakage; but there is a groove 134 extending longitudinally along the outside cylindrical surface of the collar 132, and this groove 134 is of progressively increasing cross section in a downstream direction. Thus, movement of the collar 132 toward the left in Figure 2 brings larger cross sections of the groove 134 opposite the upstream edge of the opening 130 and permits flow of gas at a faster rate through the opening 130.

With this tapered groove 134 moving as a unit with the valve element 114, as the valve element moves away from the plastic seat insert 116, the space for passage of gas through the opening 130 increases as the valve element 114 moves into wider open positions away from the plastic insert 116.

The bushing 102 is secured in position by threads, as previously described. The ring 112, plastic insert 116, reinforcing ring 120 and the other ring 124 are all clamped together and against the bushing 102 by the spring 106. There are packing rings 138 around a stem 140 of the valve element 114, and also around the bushing 102 and the plastic seat insert 116.

Referring again to Figure 1, the valve stem 140 extends through the end of the bushing 102 and confronts the inner face of a wobble plate 144. This wobble plate 144 is connected by a ball bearing 146 to a hub 148 at the inner end of a shaft 150. This shaft 150 extends through a bearing 152 in a bushing 154 threaded into one end of the housing section 13. The bushing 154 is locked against rotation by a pin 158.

A handle 160 fits over the outer end of the shaft 150 and is secured to the shaft by a nut 162. The shaft 150, and its connected handle 160, are held against outward displacement by a flange 166 which bears against the end face of the bearing 152 as a thrust bearing.

Another shaft 168 fits into a bearing 169 in a recess formed in an end wall of the housing section 13. This shaft 168 extends outwardly into the hub 148 of the shaft 150. A spring 170 is coiled around the shaft 168 and has ends which extend upwardly on opposite sides of studs 172 and 174. The stud 172 extends from the end wall of the housing section 13 and is thus rigidly fixed with respect to the housing. The stud 174 extends from a finger 176, the lower portion of which surrounds the shaft 168 and has a clutch jaw 178 engaging a complementary recess in the hub 148.

With this construction, it will be apparent that the finger 176 and the stud 174 move angularly about the aligned axes of the shafts 150 and 168 whenever the handle 160 is rotated.

The spring 170 thus tends to hold the shaft 168, and with it the shaft 150 and handle 160, in a center position. This operation is best understood by reference to Figure 3. Rotation of the handle so as to move the stud 174 in a counter-clockwise direction, will swing the left-hand end of the spring 170 toward the left into a position such as is indicated in dotted lines in Figure 3. The other end of the spring, which is ahead of the plane of section in Figure 3 and shown, therefore, in dot-and-dash lines, is held against movement by the stud 172.

Thus movement of the left-hand end of the spring 170 into the dotted line position in Figure 3 winds the spring 170 around the shaft 168 and causes a tension urging the stud 174 back into its neutral position shown in full lines in Figure 3.

Conversely, rotation of the handle so as to move the stud 174 clockwise in Figure 3, moves the other end of the spring 170, that is, the end shown in dot-and-dash lines, clockwise while the fixed stud 172 prevents movement of the other end of the spring. The spring tension thus produced urges the stud 174 back to its neutral position whenever the handle is released.

Referring again to Figure 1, the rotation of the handle 160 causes the flange 166 to turn and displace the wobble plate 144 so that the wobble plate pushes the valve stem 140 toward the left in Figure 1 to move the valve element 114 into open position.

Angular movement of the inner race of the ball bearing 146 causes the wobble plate 144 to move so that its point of closest approach to the end wall of the housing moves angularly about the axis of the hub 148 and shaft 150. The operation of the wobble plate 144 in moving the valve stems 140 and 204 will be best understood by reference to Figure 6.

Figure 6 is a development showing the relative axial displacement of the different points around the peripheral portions of the wobble plate 144 when it is in its mid or neutral position. The wobble plate 144 touches the valve stem 204 but has a slight clearance from the stem 140.

Rotation of the handle in a direction to load the sensing pressure chamber has the effect of shifting the wobble plate 144 to the right; that is, the sine wave representing the plate 144 moves to the right in Figure 6. Since the valve stem 204 is at the low point of the sine wave, movement of the wobble plate in either direction displaces the valve stem 204 axially and moves its valve into open position.

Any substantial movement of the wobble plate 144 to the right takes up the lost motion or clearance between the plate 144 and the valve stem 140 and moves that valve stem 140 axially to open its valve. The stem 140 is adjusted to move its valve element into open position slightly ahead of the valve element operated by the stem 204. In practice, the cam or wobble plate 144 has its mid position about 15 degrees to the left of that shown in Figure 6, to get more venting of the apparatus.

Rotation of the handle in a direction to vent the sensing pressure chamber has the effect of shifting the wobble plate 144 to the left. This operates the valve stem 204 but does not affect the valve stem 140 since the wobble plate merely increases its clearance from the valve stem 140.

Moving of the valve stem 140 to shift the valve element 114 into open position permits gas to pass to the clearance 128 (Figures 2 and 5), and from this clearance the gas passes through a passage 190 (Figure 5) to another valve assembly indicated generally by the reference character 192 and located in a valve chamber 200 which corresponds to the valve chamber 100 at the other end of the passage 190. All of the structure in the valve chamber 200 is similar to that in the valve chamber 100, with the exception that the valve seat 192, bushing 212 and nut 206 are tightened against sleeve.

The valve element in the chamber 200 is indicated by the reference character 202 and this valve element has a stem 204 which extends outwardly through a bushing 206 into position to be operated by the wobble plate 144. The passage 190 supplies gas to a clearance 210 around a ring 212 which corresponds to the ring 124 of the valve element 114.

When the valve element 202 is in closed position, gas passing through the passage 190 reaches the clearance 210, but can not pass the valve element 202. There is, however, a bleed passage 216 leading from the passage 190. This bleed passage 216 has a threaded counterbore 218.

Near its outer end there is a bushing 220 screwed into the counterbore 218 and having a bleed orifice 223 therein. A valve element 224 fits the opening through the bushing 220 and is slideable in the bushing as a bearing. When the gas pressure is sufficiently high, some gas can escape through the running clearance between the valve element 224 and the inside surface of the bushing 220. In order to provide a more adequate bleeding of gas from the passage 190, however, there is a tapered channel 226 in the circumference of the valve element 224, and this channel 226 is of decreasing depth toward its upstream end.

A spring 227 urges the valve element 224 upwardly toward the inner end of the counterbore 218 and brings the deeper end of the channel 226 into the bushing 220. Gas pressure moves the valve element 224 against the force of the spring 227 and this movement brings the shallower part of the channel 226 into the bushing 220, thus maintaining the rate of gas flow more nearly constant by reducing the cross section of the opening to compensate the higher pressure.

The bleed passage 216 provides, therefore, an outlet through which gas in the passage 190 escapes to reduce the pressure substantially to atmospheric whenever the supply of gas to the passage 190 is shut off by moving the valve element 114 into closed position.

This bleed provided by the passage 216 gives the operator a very fine control of the supply of gas for sensing pressure because movement of the valve element 114 into position to supply only as much gas as can escape through passage 216 causes no substantial increase in pressure in the passage 190; and the building up of the pressure in the passage 190 depends upon movement of the valve element 114 into a sufficiently wide open position to supply gas faster than it escapes through the passage 216 and past the valve element 224. In loading, both valves 114 and 202 are open and the orifice 224 is almost closed (spring compressed) except for a small leakage through the sliding fit.

The orifice 224 also has an additional purpose. It vents the passage 190 in case of malfunction (leakage) of valves 114 and 202 and thus prevents overpressurization of chamber 74.

The valve chamber 200 communicates with a passage 236 leading to the sensing pressure chamber 74. When the valve element 202 is in open position, and the valve element 114 is in position to supply a substantial flow of gas, pressure builds up in the passage 190 and in the passage 236 and chamber 74.

When there is enough pressure in the chamber 74 and the cylinder 68 (Figure 1) to move the piston 60 and to open the valve element 32, gas flows from the inlet port 22, past the valve element 32, and into the outlet port 24 and gage port 26. The operator watches the pressure rise, as indicated by the gauge connected to the port 25, until the gas pressure reaches the desired outlet pressure for the regulator. The operator then lets go of the handle 160 and permits the spring 170 to bring the wobble plate 144 into its neutral position. This causes both of the valve elements 114 and 202 (Figure 5) to move into closed position. No further flow of gas to the sensing pressure chamber of the valve can take place because of the movement of the valve element 114 into closed position; and no escape of sensing pressure can take place because of the movement of the valve 202 into closed position.

If the operator wishes to reduce the outlet pressure of the regulator, he turns the handle 160 toward the left, that is, counter-clockwise in Figure 4 and this operates the wobble plate so as to move the valve element 202 (Figure 5) into open position while leaving the valve element 114 in closed position, as will be apparent from the shape of the displacement curve of plate 144 in Figure 6.

This movement of the valve element 202 to open position, while the valve element 114 remains in closed position, permits the escape of sensing pressure into the passage 190, passage 216 and past the valve element 224. This drop in the sensing pressure causes the operating piston 60 (Figure 1) to be moved toward the right in Figure 1 and causes the plastic insert 62 to move away from the stem at the right-hand end of the valve element 32. The valve element can not follow the movement of the piston 60 because of the fact that the valve element is already in closed position and therefore can not be moved any further toward the right by the spring 48.

There is a longitudinal passage 230 extending through the valve element 32 to a clearance 232 at a mid portion of the cylindrical section 44 of the valve element. The longitudinal passage 230 communicates with the clearance 232 through a radial port 234; and there is a communicating passage 236 through which gas escapes to the atmosphere.

Thus, the pressure on the downstream side of the regulator is reduced by escape of gas through the passage 236, and the operator watches the pressure gauge until the downstream pressure of the regulator has reached the desired value. He then lets go of the handle 160 and permits the spring 170 to move the wobble plate 144 back into its neutral position. This results in a movement of the valve 202 (Figure 5) into closed position and stops further reduction in the sensing pressure.

Figure 7 shows a "panic" or emergency valve for venting the sensing pressure chamber quickly. A passage 240 connects the chamber 74 with the chamber of the regulator containing the stud 174. This latter chamber is open to the atmosphere.

A valve seat assembly 245 screws into threads 248 in a counterbore 250 at the rearward end of the passage 240. This assembly 245 has an O-ring 252 in a circumferential groove 254 for preventing leakage of gas around the outside of the seat assembly. There is a seat 255, preferably made of plastic such as nylon, at the forward end of a passage 256 through the valve assembly 245.

A valve element 258 contacts with the seat 255 when in closed position to shut off the flow of gas to the passage 256. This valve element is urged toward closed position by a helical spring 259 compressed between the valve element 258 and a shoulder 260 in the passage 240.

The valve element 258 has a stem 262 that slides axially in a bearing 264 of the valve seat assembly 245. In order to provide for substantially instantaneous release of gas pressure from the chamber 74, when the valve element 258 is in open position, there are passages 266 and 267 by-passing the running clearance between the valve stem 262 and the bearing 264.

At the end of the valve stem 262 remote from the valve element 258, there is a ball 270 movable along a guide 272 at the rearward end of the bearing 264. The rearward end of the guide 272 converges slightly to a diameter less than that of the ball 270 so as to retain the ball in the guide. This ball 270 is merely representative of low-friction actuators for moving the valve stem axially against the force of the spring 258. Functionally, the stem 262 and the ball 270 are part of the valve element 258 and move as a unit therewith.

The ball 270 is in the path of a cam face 275 on the end of the stud 174 and the movement of the stud 174 past the ball 270 causes the cam face 275 to displace the ball 270, valve stem 262 and valve element 258 toward the left in Figure 7 so that the valve element is in open position. Gas escapes through the passage 240, around the periphery of a flange 277 of the valve element 258, between the valve element 258 and the seat 255, through an annular clearance around the valve stem 262 for a part of the length of the valve stem, and then through the passages 266 and 267 to the open interior at the rearward end of the housing.

The location of the emergency valve with respect to the operating mechanism is shown in Figure 3. Whenever the operating handle is turned as far as possible in the direction to vent the sensing pressure, the stud 174 moves across the ball 270 and shifts the emergency valve into open position.

The preferred embodiment of the invention has been illustrated and described, but changes and modifications can be made, and some features can be used in different combinations without departing from the invention as defined in the claims.

What is claimed is:

1. In apparatus for controlling the pressure, a pressure loading chamber, two valve chambers, the first of which has a passage for receiving gas at high pressure and the second of which has a passage for the flow of gas to and from the loading chamber, a third passage through which both of the valve chambers communicate with one another, a first valve element in the first chamber at a location to control the flow of the high pressure gas through said first chamber, a second valve element in the second chamber at a location to control the flow of gas to and from the loading chamber, common operating means for both the first and second valve elements including mechanism that operates both valve elements when the common operating means moves in one direction and mechanism that operates only the second valve element when said operating means is moved in the other direction, and a bleed conduit through which gas escapes from said third passage, the cross section of the bleed conduit being substantially smaller than the cross section of the passages through which gas flows to the loading chamber when the valve elements are in open position whereby gas cannot escape from the bleed conduit as rapidly as it enters the loading chamber.

2. The apparatus for controlling a pressure regulator described in claim 1 and in which the bleed passage communicates with the gas space on the upstream side of the second valve element and the downstream side of the first valve element and there are means controlling the rate of escape of gas from said bleed passage.

3. The apparatus for controlling a pressure regulator described in claim 1 and in which the operating mechanism for the first and second valves has a different reciprocating element for operating each valve, and the common operating means has sloping surfaces that contact with the reciprocating elements, the slopes of said surfaces being so correlated, when the common operating means is in a mid position, that the movement of the surfaces in one direction operates only one valve element and movement in the other direction operates both valve elements.

4. Apparatus for controlling the pressure in a sensing pressure chamber of a pressure regulator, said apparatus comprising two valve chambers, the first of which has a passage for receiving gas at high pressure and the second of which has a passage for the flow of gas beyond the second valve chamber, a third passage through which both of the valve chambers communicate with one another, a first valve element in the first chamber at a location to control the flow of the high pressure gas through said first chamber, a second valve element in the second chamber at a location to control the flow of gas to and from the passage, common operating means for both the first and second valve elements including mechanism that operates both valve elements when the common operating means moves in one direction, mechanism that operates only the second valve element when said operating means is moved in the other direction, and a bleed conduit through which gas escapes from said third passage, and in which the bleed passage communicates with the gas space on the upstream side of the second valve element and on the downstream side of the first valve element and there are means for controlling the rate of escape of gas from said bleed passage including a bleed valve element that slides longitudinally in a bearing, and the running clearance between the bleed valve element and the bearing is part of the bleed passage, the bleed valve element being urged in one direction by the pressure of gas seeking to escape through the bleed passage, a spring urging the bleed valve element in the other direction against the pressure of said gas, the bleed valve element having a change in cross section along its length to change the clearance with longitudinal movement of the bleed valve element in its bearing, the change in cross section being to a larger cross section towards the downstream end of the bleed valve element.

5. The apparatus for controlling a pressure regulator described in claim 4 and in which the change in cross section is in the form of a narrow groove in the peripheral face of the bleed valve element extending lengthwise of said bleed valve element and becoming somewhat deeper toward the discharge end of the bleed valve element whereby the cross section for the escape of gas becomes greater as the pressure head across the bleed valve element decreases and the bleed valve element is moved lengthwise in its bearing by the pressure of its spring.

6. Apparatus for controlling the pressure in a sensing pressure chamber of a pressure regulator, said apparatus comprising two valve chambers, the first of which has a passage for receiving gas at high pressure and the second of which has a passage for the flow of gas beyond the second valve chamber, a third passage through which both of the valve chambers communicate with one another, a first valve element in the first chamber at a location to control the flow of the high pressure gas through said first chamber, a second valve element in the second chamber at a location to control the flow of gas to and from the passage, common operating means for both the first and second valve elements including mechanism that operates both valve elements when the common operating means moves in one direction, mechanism that operates only the second valve element when said operating means is moved in the other direction, and a bleed conduit through which gas escapes from said third passage and in which the operating mechanism for the first and second valves has a different reciprocating element for operating each valve, and the common operating means has sloping surfaces that contact with the reciprocating elements, the slopes of said surfaces being so correlated, when the common operating means is in a mid position, that the movement of the surfaces in one direction operates only one valve element and movement in the other direction operates both valve elements, and in which the apparatus has a housing and the common operating means is a rotatable wobble plate supported by the housing and connected to other parts of said operating means for movement as a unit therewith, and there are spring means which are stressed by rotation of the common operating means in either direction from a neutral mid position for turning the common operating means back to said mid position when the rotating force is removed.

7. In a pressure regulator having a sensing pressure chamber, a passage communicating with the sensing pressure chamber at one end and for receiving gas at high pressure at the other end, two valve elements commanding said passage and in series with one another, and a bleed conduit leading from the passage at a location between the valve elements and always open for the escape of gas at any pressure down to the minimum pressure supplied to the sensing pressure chamber, the cross section of the bleed conduit being substantially smaller than the cross section of said passage, and a common actuator for said valve elements movable into two different positions in one of which it opens both valve elements and in the other of which it opens only the valve element at said one end of the passage.

8. In apparatus for controlling the supply of pressure to and from a sensing pressure chamber, a passage for receiving gas at high pressure at one end, and into and out of which gas flows at the other end, two valves commanding the passage and in series with each other, a bleed conduit leading from the passage at a location between the valves and always open for the escape of gas at any pressure, and there is a valve element in the bleed conduit movable to vary the cross section of the bleed outlet to decrease the cross section with increase in pressure in said passage.

9. The apparatus for controlling a pressure regulator described in claim 8 and in which the bleed valve element is a slide valve which moves axially in a bearing, and a part of the bleed passage consists of a channel extending lengthwise of the bleed valve element and varying in cross section to a smaller cross section toward the upstream end of the bleed valve element whereby movement of the bleed valve element in the direction of the gas flow brings a progressivly greater length of the bleed valve element beyond the bearing and decreases the minimum cross section of the channel which is surrounded by the bearing in which the bleed valve slides.

References Cited in the file of this patent
UNITED STATES PATENTS

| | | |
|---|---|---|
| 1,742,669 | Ross | Jan. 7, 1930 |
| 1,916,384 | Newberg | July 4, 1933 |
| 2,047,101 | Grove | July 7, 1936 |
| 2,164,095 | Thomes | June 27, 1939 |
| 2,202,313 | Grove | May 28, 1940 |
| 2,476,378 | Majneri | July 19, 1949 |